US008514326B2

(12) United States Patent
Miyashita et al.

(10) Patent No.: US 8,514,326 B2
(45) Date of Patent: *Aug. 20, 2013

(54) INFORMATION PROCESSING APPARATUS, INFORMATION PROCESSING METHOD, PROGRAM, AND INFORMATION PROCESSING SYSTEM

(75) Inventors: Akira Miyashita, Tokyo (JP); Kazuhiro Suzuki, Tokyo (JP); Hiroyuki Ishige, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,937

(22) Filed: Dec. 27, 2011

(65) Prior Publication Data
US 2012/0092371 A1 Apr. 19, 2012

Related U.S. Application Data

(63) Continuation of application No. 13/131,831, filed as application No. PCT/JP2010/069501 on Nov. 2, 2010, now Pat. No. 8,089,513.

(30) Foreign Application Priority Data

Nov. 16, 2009 (JP) .................................. 2009-260977

(51) Int. Cl.
*H04N 5/225* (2006.01)
*G09G 5/00* (2006.01)
(52) U.S. Cl.
USPC .......................................... 348/374; 345/633

(58) Field of Classification Search
USPC .............. 348/52, 53, 36, 159, 169, 140, 139, 348/157, 51; 345/633, 157, 419, 158, 169, 345/418
See application file for complete search history.

(56) References Cited

U.S. PATENT DOCUMENTS

| 6,972,734 B1* | 12/2005 | Ohshima et al. ................... 345/8 |
| 8,089,513 B2* | 1/2012 | Miyashita et al. ............ 348/139 |
| 2005/0024388 A1 | 2/2005 | Takemoto |
| 2006/0038833 A1 | 2/2006 | Mallinson et al. |
| 2011/0169861 A1 | 7/2011 | Suzuki et al. |

FOREIGN PATENT DOCUMENTS

| EP | 1 060 772 A2 | 12/2000 |
| EP | 1 262 213 A1 | 12/2002 |
| JP | 2000 353248 | 12/2000 |
| JP | 2002 149581 | 5/2002 |
| JP | 2005 049996 | 2/2005 |
| JP | 2008 510254 | 4/2008 |
| WO | WO 2011/070871 A1 | 6/2011 |

OTHER PUBLICATIONS

Extended Supplementary European Search Report issued May 7, 2012 in corresponding European Application No. 10818085.
International Search Report and Written Opinion issued Nov. 30, 2010 in PCT/JP10/069501, filed Nov. 2, 2010.
Office Action issued May 10, 2011, Japanese Patent Application No. 2009-260977.

\* cited by examiner

*Primary Examiner* — Behrooz Senfi
(74) *Attorney, Agent, or Firm* — Oblon, Spivak, McClelland, Maier & Neustadt, L.L.P.

(57) ABSTRACT

Provided is an information processing apparatus including an image acquisition unit for acquiring a real space image including an image of another apparatus, a coordinate system generation unit for generating a spatial coordinate system of the real space image acquired by the image acquisition unit, and a transmission unit for transmitting spatial information constituting the spatial coordinate system generated by the coordinate system generation unit to the other apparatus sharing the spatial coordinate system.

15 Claims, 9 Drawing Sheets

INFORMATION PROCESSING APPARATUS, INFORMATION PROCESSING METHOD, PROGRAM, AND INFORMATION PROCESSING SYSTEM

CROSS-REFERENCE TO RELATED APPLICATION

This application is a continuation of U.S. application Ser. No. 13/131,831, filed May 27, 2011, the contents of which are incorporated herein by reference, and which is the National State of PCT/JP10/069,501, filed Nov. 2, 2010 and claims priority to Japanese Patent Application 2009-260977, filed Nov. 16, 2009.

TECHNICAL FIELD

The present invention relates to an information processing apparatus, an information processing method, a program, and an information processing system.

BACKGROUND ART

Recently, technology of superimposing virtual information on real space information of a photographed image and the like and displaying the superimposed information has been performed as a part of augmented reality technology. For example, it is possible to read a predetermined mark and the like included in a photographed image, superimpose virtual information corresponding to the mark on a real space image, and display the superimposed information (for example, Patent Literature 1).

CITATION LIST

Patent Literature

Patent Literature 1: Japanese Unexamined Patent Application Publication No 2008-510254

SUMMARY OF INVENTION

Technical Problem

However, in Patent Literature 1, since the virtual information is displayed using the mark, the virtual information may not be superimposed and displayed when the mark does not exist, and the virtual information may not be shared among a plurality of users.

The present invention is made in view of the above-described issue, and aims to provide a novel and modified information processing apparatus, an information processing method, a program, and an information processing system, which enable a virtual space to be shared by other apparatuses by detecting the position information of the other apparatuses.

Solution to Problem

According to an aspect of the present invention, in order to achieve the above-described object, there is provided an information processing apparatus including: an image acquisition unit for acquiring a real space image including an image of another apparatus; a coordinate system generation unit for generating a spatial coordinate system of the real space image acquired by the image acquisition unit; and a transmission unit for transmitting spatial information constituting the spatial coordinate system generated by the coordinate system generation unit to the other apparatus sharing the spatial coordinate system.

Furthermore, the information processing apparatus may include an acquisition unit for acquiring a spatial coordinate of the other apparatus, a spatial coordinate of its own apparatus, and an angle of a vector connecting the spatial coordinate of the other apparatus to the spatial coordinate of its own apparatus, and the transmission unit may transmit the other spatial coordinate, the spatial coordinate of its own apparatus, and the angle of the vector to the other apparatus as the spatial information.

Furthermore, the acquisition unit may acquire a rotation angle of the spatial coordinate system from the angle of the vector connecting the spatial coordinate of the other apparatus to the spatial coordinate of its own apparatus, and the transmission unit may transmit the spatial information including the rotation angle acquired by the acquisition unit to the other apparatus.

Furthermore, the acquisition unit may acquire a GPS coordinate of the other apparatus, and the transmission unit may transmit the spatial information including the GPS coordinate of the other apparatus acquired by the acquisition unit to the other apparatus.

Furthermore, the information processing apparatus may include a storage unit for storing virtual information superimposed and displayed on the real space image, and identification information of the virtual information, the virtual information being associated with the identification information, and the acquisition unit may acquire a spatial coordinate of a display position of the virtual information superimposed and displayed on the real space image, and the transmission unit may transmit the spatial information including the spatial coordinate of the display position of the virtual information to the other apparatus.

Furthermore, the acquisition unit may acquire identification information of the virtual information, and the transmission unit may transmit the spatial information including the identification information of the virtual information to the other apparatus together with a spatial coordinate of a display position of the virtual information.

Furthermore, when the virtual information is associated with a GPS coordinate of the virtual information, the acquisition unit may acquire a spatial coordinate of a display position of the virtual information by correcting the GPS coordinate of the virtual information according to a positional relationship between the spatial coordinate of the other apparatus and the spatial coordinate of its own apparatus.

Furthermore, the other apparatus may generate the spatial coordinate system, which is shared by the information processing apparatus, based on the spatial information transmitted from the transmission unit.

Furthermore, when the acquisition unit acquires the spatial information constituting a spatial coordinate system generated by the other apparatus, the coordinate system generation unit may generate the spatial coordinate system based on the spatial information acquired from the other apparatus.

According to another aspect of the present invention in order to achieve the above-described object, there is provided an information processing method for allowing one information processing apparatus to perform the steps of: acquiring a real space image; generating a spatial coordinate system of the real space image acquired by the image acquisition unit; transmitting spatial information constituting the spatial coordinate system generated by the coordinate system generation unit to the other apparatus sharing the spatial coordinate system; and generating the spatial coordinate system by the other apparatus having received the spatial information based on the spatial information, the spatial coordinate system being shared by the information processing apparatus.

According to another aspect of the present invention in order to achieve the above-described object, there is provided a program for allowing a computer to serve as an information processing apparatus, wherein the information processing apparatus includes: an image acquisition unit for acquiring a real space image; a coordinate system generation unit for generating a spatial coordinate system of the real space image acquired by the image acquisition unit; and a transmission unit for transmitting spatial information constituting the spatial coordinate system generated by the coordinate system generation unit to the other apparatus sharing the spatial coordinate system.

According to another aspect of the present invention in order to achieve the above-described object, there is provided an information processing system including one information processing apparatus, wherein the one information processing apparatus includes: an image acquisition unit for acquiring a real space image; a coordinate system generation unit for generating a spatial coordinate system of the real space image acquired by the image acquisition unit; and a transmission unit for transmitting spatial information constituting the spatial coordinate system generated by the coordinate system generation unit to another apparatus sharing the spatial coordinate system, wherein the other apparatus connected to the one information processing apparatus through a network includes a coordinate system generation unit for generating the spatial coordinate system, which is shared by the information processing apparatus, based on the spatial information transmitted from the transmission unit, and the spatial information includes a spatial coordinate of the other apparatus, a spatial coordinate of its own apparatus, and an angle of a vector connecting the spatial coordinate of the other apparatus to the spatial coordinate of its own apparatus.

Advantageous Effects of Invention

According to the present invention as described above, spatial information is shared among a plurality of apparatuses, so that it is possible to display virtual information suitable for the position and posture of each apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, the description of "preferred embodiments of the present invention" will be given in the following order.

[1] Object of present embodiment
[2] Outline of information processing system
[3] Hardware configuration of information processing apparatus
[4] First embodiment
[4-1] Functional configuration of information processing apparatus
[4-2] Details of operation of information processing apparatus
[5] Second embodiment
[5-1] Configuration of information processing apparatus
[6] Third embodiment
[6-1] Configuration of information processing apparatus

[1] Object of Present Embodiment

First, the object of the present embodiment will be described. Recently, technology of superimposing virtual information on real space information of a photographed image and the like and displaying superimposed information has been performed as a part of augmented reality technology. For example, it is possible to read a predetermined mark and the like included in a photographed image, superimpose virtual information corresponding to the mark on real space information, and display the superimposed information. However, since the virtual information is displayed using the mark, the virtual information may not be superimposed and displayed when the mark does not exist, and the virtual information may not be shared among a plurality of users.

Furthermore, for example, technology capable of displaying virtual information according to the position and posture of each person by allowing position information and posture information to be shared among a plurality of users has been disclosed. In this technology, each user terminal is provided with a reader for reading an ID tag, and an ID tag embedded in a floor is read by the reader, so that position information of each user terminal is acquired.

However, in this technology, it is necessary to mount a device for acquiring the position information, resulting in an increase in the cost for installing a system. Furthermore, since the position information is shared among the plurality of users only when the ID tag is embedded in the floor, an available place may be limited. In this regard, considering this point, an information processing system 1 according to the embodiment of the present invention has been created. In accordance with the information processing system 1 according to the present embodiment, it is possible to allow virtual information to be shared by other apparatuses by detecting the position information of the other apparatuses.

[2] Outline of Information Processing System

Figure 1:
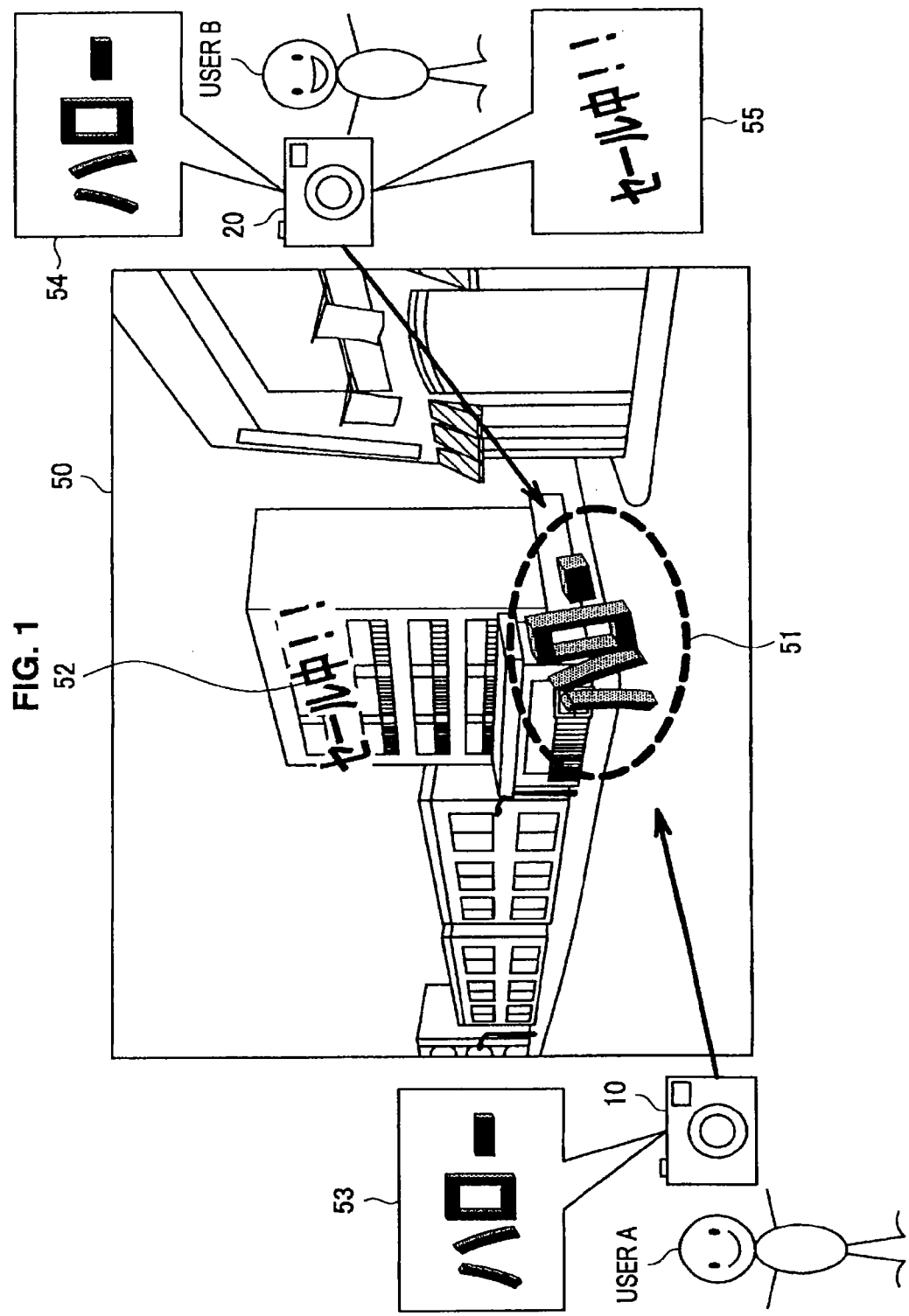
FIG. 1 is a diagram for explaining an outline of an information processing system according to an embodiment of the present invention.

Next, the outline of the information processing system 1 will be described with reference to FIGS. 1 and 2. FIG. 1 is a diagram for explaining the outline of the information processing system 1. The information processing system 1 includes a plurality of apparatuses such as an information processing apparatus 10 and an information processing apparatus 20. In the following description, for the purpose of convenience, a case where the information processing system 1 includes two apparatuses, that is, the information processing apparatus 10 and the information processing apparatus 20, will be described.

The information processing apparatus 10 or the information processing apparatus 20, for example, can be exemplified as an information processing terminal provided with a display device, such as a cell phone, a personal digital assistant (PDA), a portable game machine or a small personal computer (PC). The information processing apparatus 10 or the information processing apparatus 20 stores a plurality of pieces of virtual information superimposed and displayed on a real image. Each piece of virtual information is associated with identification information for identifying the virtual information.

For example, as shown in FIG. 1, it is assumed that a user A captures an image of a predetermined space using the information processing apparatus 10 and a user B captures an image of a predetermined space using the information processing apparatus 20. It is assumed that the user A and the user B are positioned at different places. It is assumed that the user A views virtual information 51 through the information processing apparatus 10. Meanwhile, it is assumed that the user B positioned at a place different from that of the user A also views the virtual information 51 through the information processing apparatus 20.

However, when spatial coordinate systems do not coincide with each other between the information processing apparatus 10 and the information processing apparatus 20, a difference may occur in the visibility of virtual information viewed from the positions thereof. When the spatial coordinate systems are different from each other between the information processing apparatus 10 and the information processing apparatus 20, virtual information superimposed on a real space image is in a state where each apparatus views the virtual information 51 from the front (a display example 53 of virtual information and a display example 55 of virtual information).

Furthermore, when the positions of the apparatuses cannot be accurately detected, since a difference occurs in viewing places of the user A and the user B, the virtual information 55 may be virtual information viewable only by the user B.

Figure 2:
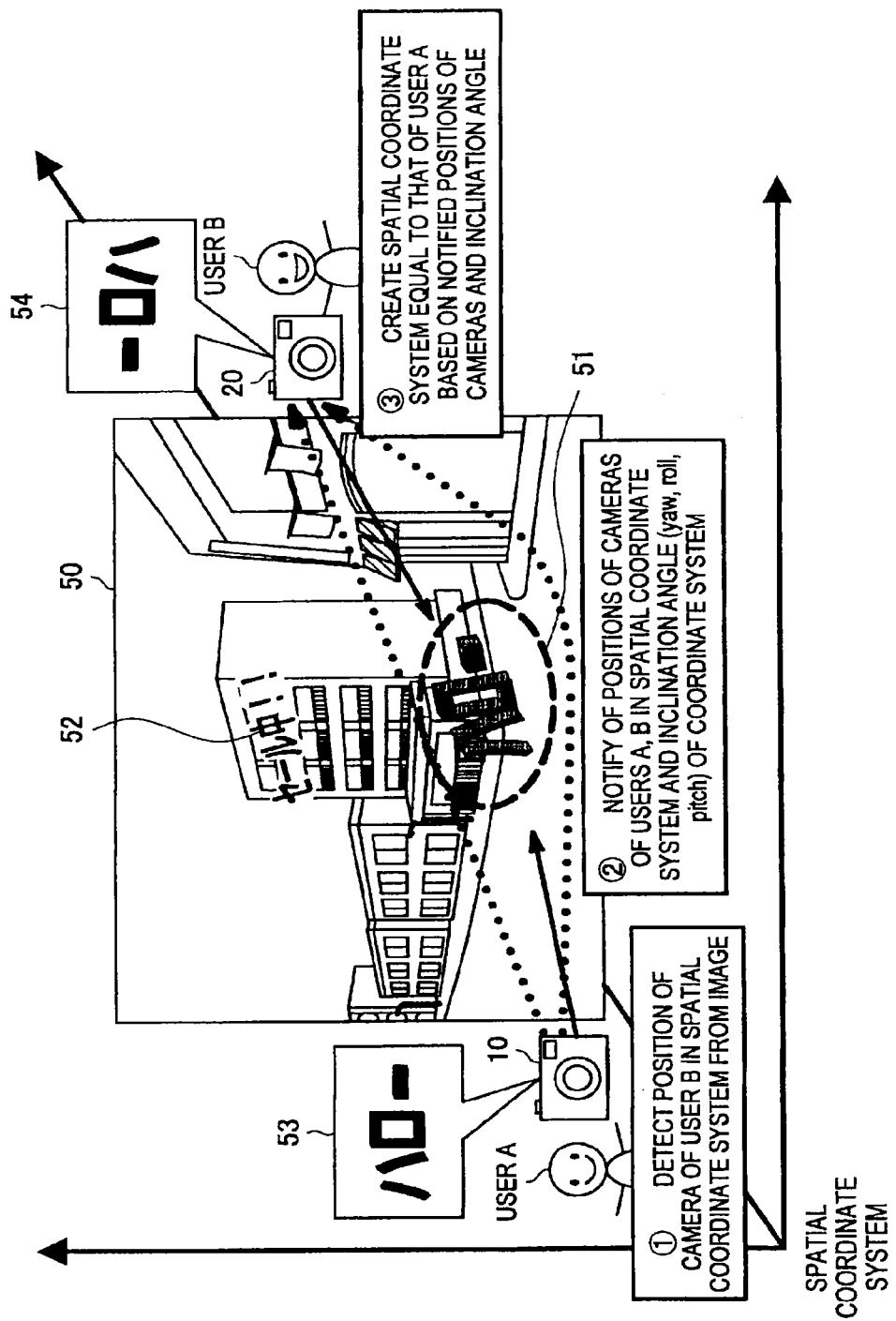
FIG. 2 is a diagram for explaining the outline of the information processing system according to the same embodiment.

In this regard, in the present embodiment, the position information of the user A and the user B is accurately detected according to procedures 1 to 3 of FIG. 2, so that the same virtual information can be appropriately displayed among a plurality of users. The procedures 1 to 3 of FIG. 2 are as follows: procedure 1—detect the position information of an information processing apparatus (a camera) of the user B in a spatial coordinate system from a captured image; procedure 2—notify the user B the position information of the information processing apparatuses (the cameras) of the users A and B in the spatial coordinate system and an inclination angle of a coordinate system; and procedure 3—the user B creates a spatial coordinate system equal to that of the user A based on the notified position information of the information processing apparatuses (the cameras) and inclination angle.

Herein, the inclination angle, for example, includes yaw, roll, pitch, and the like. Since the position information of the user A and the user B is recognized according to the procedures, it is possible to share the same spatial coordinate system among a plurality of users. For example, as shown in FIG. 2, the same spatial coordinate system is shared between the user A and the user B and the virtual information 51 is viewed by the user A and the user B. In such a case, since the user A is positioned at a place where the user A views virtual information from the front, the user A is in a state where the user A views virtual information from the front (the display example 53 of the virtual information). Meanwhile, since the user B is positioned at a place where the user B views virtual information from the back, the user B is in a state where the user B views virtual information from the back (the display example 54 of the virtual information).

In this way, accurate position information of another apparatus included in the real space image is detected, so that the same spatial coordinate system is shared, resulting in sharing a virtual space for superimposing virtual information. As described above, the information processing apparatus 20 owned by the user B may be notified of spatial information constituting a spatial coordinate system by the information processing apparatus 10 owned by the user A to, or the information processing apparatus 10 may be notified thereof by the information processing apparatus 20.

Hereinafter, the configuration of the information processing apparatus 10 that notifies another apparatus of the spatial information will be described in detail. However, the information processing apparatus 20 may have the configuration of the information processing apparatus 10. Furthermore, the information processing apparatus 10 may be configured to generate a spatial coordinate system based on the spatial information notified of by the information processing apparatus 20.

[3] Hardware Configuration of Information Processing Apparatus

Figure 3:
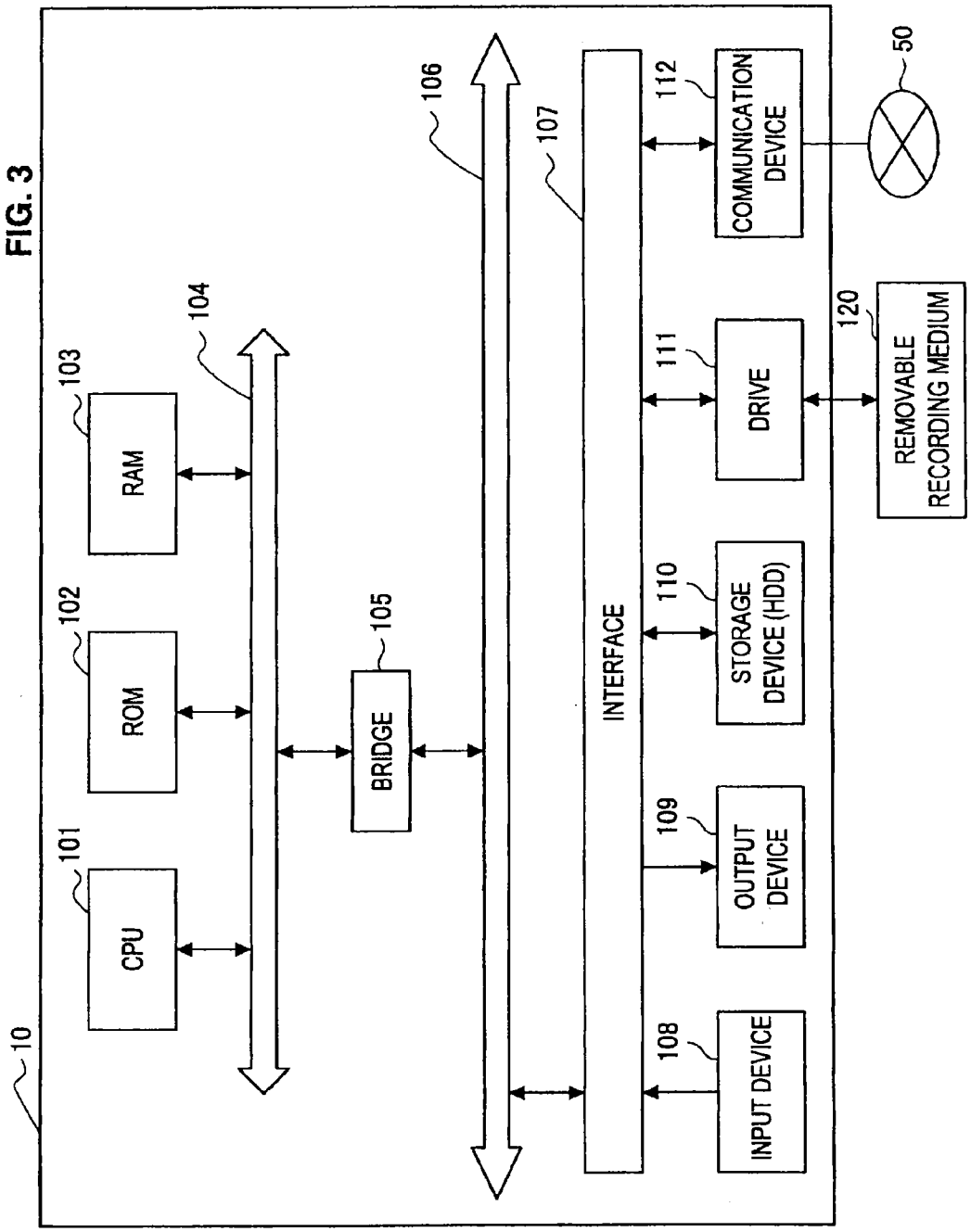
FIG. 3 is a block diagram showing a hardware configuration of the information processing apparatus according to the same embodiment.

So far, the outline of the information processing system 1 has been described. Next, the hardware configuration of the information processing apparatus 10 will be described with reference to FIG. 3. In FIG. 3, while the hardware configuration of the information processing apparatus 10 will be described, since the information processing apparatus 20 has substantially the same hardware configuration as the information processing apparatus 10, detailed description thereof will be omitted.

FIG. 3 is a block diagram showing the hardware configuration of the information processing apparatus 10. The information processing apparatus 10 includes a central processing unit (CPU) 101, a read only memory (ROM) 102, a random access memory (RAM) 103, a host bus 104, a bridge 105, an external bus 106, an interface 107, an input device 108, an output device 110, a storage device (hard disk drive; HDD) 111, a drive 112, and a communication device 115.

The CPU 101 serves as an operation processing device and a control device and controls the entire operation of the information processing apparatus 10 according to various programs. Furthermore, the CPU 101 may be a microprocessor. The ROM 102 stores programs, operation parameters and the like which are used by the CPU 101. The RAM 103 primarily stores programs used for the execution of the CPU 101, parameters appropriately changing in the execution of the CPU 101, and the like. The CPU 101, the ROM 102 and the RAM 103 are connected to one another through the host bus 104 including a CPU bus and the like.

The host bus 104 is connected to the external bus 106 such as a peripheral component interconnect/interface (PCI) bus through the bridge 105. In addition, the host bus 104, the bridge 105 and the external bus 106 are not necessarily separated from one another. For example, the functions of the host bus 104, the bridge 105 and the external bus 106 may be integrated into a single bus.

The input device 108, for example, includes an input means such as a mouse, a keyboard, a touch panel, a button, a microphone, a switch or a lever for allowing a user to input information, an input control circuit for generating an input signal based on input from the user and outputting the input signal to the CPU 101, and the like. The user of the information processing apparatus 10 can operate the input device 108, thereby inputting various pieces of data to the information processing apparatus 10 or instructing the information processing apparatus 10 to perform processing operations.

The output device 109, for example, includes a display device such as a cathode ray tube (CRT) display device, a liquid crystal display (LCD) device, an organic light emitting display (OLED) device and a lamp, and an audio output device such as a speaker and a headphone. The output device 109, for example, outputs reproduced content. In detail, the display device displays various pieces of information such as reproduced video data in the form of text or images. Meanwhile, the audio output device converts reproduced audio data and the like into audio and outputs the audio.

The storage device 110 is a data storage device configured as an example of a storage unit of the information processing apparatus 10 according to the present embodiment, and may include a storage medium, a recording device for recording data on the storage medium, a reading device for reading data from the storage medium, an erasing device for erasing data recorded on the storage medium, and the like. The storage device 110, for example, includes an HDD. The storage device 110 drives a hard disk and stores programs executed by the CPU 101 and various pieces of data. Furthermore, the storage device 110 stores an item, an identification number and the like which will be described later.

The drive 111 is a reader/writer for a storage medium and is embedded in the information processing apparatus 10 or provided at an outer side of the information processing apparatus 10. The drive 111 reads information recorded on a removable storage medium 24 such as a magnetic disk, an optical disc, a magneto-optical disc or a semiconductor memory which is mounted thereon, and outputs the information to the RAM 103.

The communication device 112, for example, is a communication interface including a communication device and the like for connection to a communication network 50. Furthermore, the communication device 112 may be a wireless local area network (LAN)-compatible communication device, a wireless USB-compatible communication device, or a wired communication device for performing wired communication.

[4] First Embodiment

[4-1] Functional Configuration of Information Processing Apparatus

Figure 4:
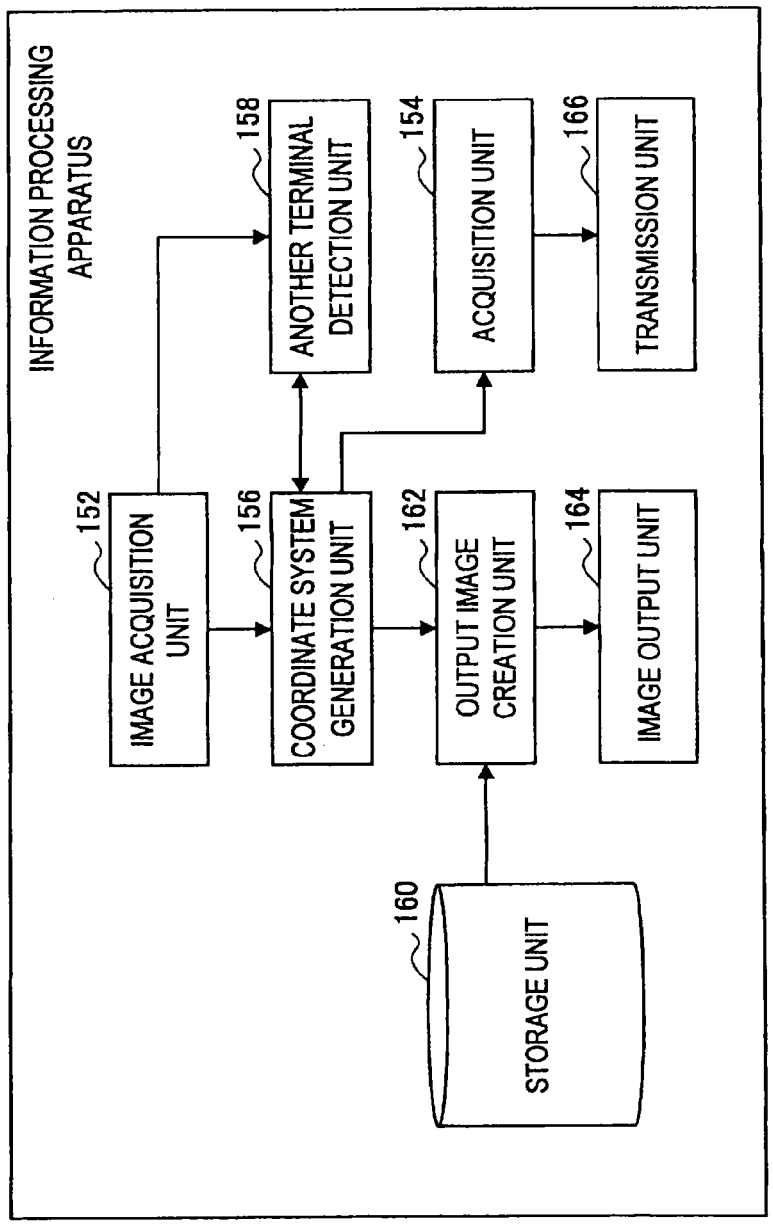
FIG. 4 is a block diagram showing a functional configuration of an information processing apparatus according to a first embodiment of the present invention.

So far, the hardware configuration of the information processing apparatus 10 has been described. Next, the functional configuration of the information processing apparatus 10 according to the first embodiment will be described with reference to FIG. 4. FIG. 4 is a block diagram showing the functional configuration of the information processing apparatus 10 according to the present embodiment.

As shown in FIG. 4, the information processing apparatus 10 includes an image acquisition unit 152, an acquisition unit 154, a coordinate system generation unit 156, an other terminal detection unit 158, a storage unit 160, an output image creation unit 162, an image output unit 164, a transmission unit 166 and the like.

The image acquisition unit 152 has a function of acquiring a real space image. The real space image includes an image such as a landscape captured by an imaging apparatus (not shown). The imaging apparatus may be integrally formed with the information processing apparatus 10, or may be provided separately from the information processing apparatus 10. For example, an image captured by an imaging apparatus provided separately from the information processing apparatus 10 may be stored in a storage device such as a memory card and acquired by the image acquisition unit 152. The image acquisition unit 152 provides the acquired real space image to the coordinate system generation unit.

The coordinate system generation unit 156 has a function of generating a spatial coordinate system of the real space image acquired by the image acquisition unit 152. As described later, when it is not possible to acquire spatial information from another apparatus included in the real space image (also, simply referred to as another apparatus), the coordinate system generation unit 156 generates an arbitrary spatial coordinate system. Meanwhile, in the case of acquiring a spatial coordinate from the other apparatus, the coordinate system generation unit 156 generates a spatial coordinate system equal to that of the other apparatus.

The spatial information is an element constituting a spatial coordinate system and includes a spatial coordinate of the other apparatus, a spatial coordinate of its own apparatus, an angle of a vector connecting the spatial coordinate of the other apparatus to the spatial coordinate of its own apparatus, and the like. The acquisition unit 154 has a function of acquiring elements constituting the spatial coordinate system. That is, the acquisition unit 154 acquires the spatial coordinate of the other apparatus positioned at the spatial coordinate generated by the coordinate system generation unit 156, the spatial coordinate of its own apparatus, and the angle of the vector connecting the spatial coordinate of the other apparatus to the spatial coordinate of its own apparatus.

Furthermore, the acquisition unit 154 may acquire a spatial coordinate of a display position of virtual information superimposed and displayed on a real space image. The spatial coordinate of the display position of the virtual information is also included in spatial information and is an element constituting a spatial coordinate system. The spatial information is transmitted to the other apparatus (the information processing apparatus 20 and the like), which shares the spatial coordinate system, by the transmission unit 166 to be described later.

Herein, the content of the spatial information transmitted from the information processing apparatus 10 to the other apparatus will be described. The spatial information, for example, includes the following information: (a) spatial coordinates in the spatial coordinate systems of the information processing apparatus 10 and the other apparatus; (b) roll (a rotation angle) of the vector connecting the spatial coordinate of the information processing apparatus 10 to the spatial coordinate of the other apparatus; and (c) identification information (ID) of virtual information being displayed and the spatial coordinate of the display position.

A distance between its own apparatus and the other apparatus is recognized from the information of (a), so that it is possible to decide the scale of the spatial coordinate system. Furthermore, it is possible to decide a rotation angle in an x direction, a y direction and a z direction in the spatial coordinate system through the information of (b).

In addition, the rotation angle of (b) may be replaced by the roll of another vector of an X axis and the like in the spatial coordinate system. However, in a case where a replacement vector is orthogonal to the vector connecting the spatial coordinate of the information processing apparatus 10 to the spatial coordinate of the other apparatus, even when the replacement vector rotates in the roll direction of the vector connecting the spatial coordinate of the information processing apparatus 10 to the spatial coordinate of the other apparatus, the roll of the replacement vector has a constant value. Therefore, the roll of the vector connecting the spatial coordinate of the information processing apparatus 10 to the spatial coordinate of the other apparatus may not be uniquely specified by the roll value of the replacement vector.

In the case of defining the replacement vector of the vector connecting the spatial coordinate of the information processing apparatus 10 to the spatial coordinate of the other apparatus and specifying the roll of the vector connecting the spatial coordinate of the information processing apparatus 10 to the spatial coordinate of the other apparatus using the rotation angle (yaw, roll, pitch) of a spatial coordinate system, it is necessary to use a vector with a rotation axis, which is not orthogonal to the vector connecting the spatial coordinate of the information processing apparatus 10 to the spatial coordinate of the other apparatus, and a rotation angle.

Consequently, in the case of using a replacement vector in order to allow unique spatial information to be shared among apparatuses, all values of yaw, roll and pitch of the replacement vector are included, so that it is possible to avoid a problem that the rotation angle of a vector cannot be uniquely specified.

Furthermore, azimuth angles of axes of the spatial coordinates of the information processing apparatus 10 and the other apparatus may be fixedly decided in advance. For example, the y axis may be decided as the direction directly above where a user stands. These fixed values may be used as the roll value of the vector connecting the spatial coordinate of the information processing apparatus 10 to the spatial coordinate of the other apparatus. In such a case, in the same manner as above, for example, when the information processing apparatus 10 and the other apparatus are positioned on the y axis, a problem may occur in which the x axis and the y axis cannot be decided. Thus, in such a case, it is necessary to decide the azimuths of the x axis and the z axis in advance, in addition to the y axis.

In the storage unit 160, the virtual information superimposed on the real space image is associated with identification information of the virtual information for identifying the virtual information.

The other terminal detection unit 158 has a function of detecting an image of another terminal included in the real space image acquired by the image acquisition unit 152 and specifying the position in the spatial coordinate system of the other terminal. The image of the other terminal included in the real space image, for example, can be detected using a well-known image processing means for performing background difference and the like. Furthermore, the position of the other terminal in the spatial coordinate system, for example, can be specified using a position detection method disclosed in Japanese Unexamined Patent Application Publication No. 2006-209334 and the like.

The output image creation unit 162 has a function of creating an output image by superimposing the virtual information stored in the storage unit 160 on the real space image captured by the imaging apparatus. The output image creation unit 162 provides the created output image to the image output unit 164.

The image output unit 164 has a function of outputting the output image provided by the output image creation unit 162 to a display (not shown) provided in the information processing apparatus 10.

The transmission unit 166 has a function of notifying the other apparatus of the above-described spatial information. The transmission unit 166 may regularly transmit the spatial information to the other apparatus, or may transmit the spatial information when the spatial information is requested by the other apparatus.

The other apparatus having received the spatial information transmitted from the transmission unit 166 generates a spatial coordinate system, which is shared by the information processing apparatus 10, based on the transmitted spatial information. The other apparatus generates the spatial coordinate system according to the spatial coordinates of the information processing apparatus 10 and the other apparatus, which are included in the transmitted spatial information, and the roll value of the vector connecting the spatial coordinate of the information processing apparatus 10 to the spatial coordinate of the other apparatus.

The other apparatus having received the spatial information decides the scales of the spatial coordinate systems from the spatial coordinates in the spatial coordinate systems of the information processing apparatus 10 and the other apparatus, which are included in the spatial coordinates. Then, the other apparatus decides the rotation angles in the x direction, the y direction and the z direction in the spatial coordinate systems from the roll (the rotation angle) of the vector connecting the spatial coordinate of the information processing apparatus 10 to the spatial coordinate of the other apparatus. In this way, the scales and axial directions of the spatial coordinate systems of the information processing apparatus 10 and the other apparatus coincide with each other.

In addition, the other apparatus superimposes the virtual information on the generated spatial coordinate system based on the identification information (ID) of the virtual information included in the spatial information and the spatial coordinate of the display position. In this way, virtual information in the virtual space can be shared by the information processing apparatus 10 and the other apparatus. That is, as shown in FIG. 2, since the virtual information is superimposed in the same spatial coordinate system, it is possible for each apparatus to appropriately view the virtual information according to the positions and postures of the information processing apparatus 10 and the other apparatus.

[4-2] Details of Operation of Information Processing Apparatus

So far, the functional configuration of the information processing apparatus 10 has been described. Next, details of the operation of the information processing apparatus 10 will be described in detail. When describing the operation of the information processing apparatus 10, processes performed between the information processing apparatus 10 and the information processing apparatus 20, which is the other apparatus, will be described.

Figure 5:
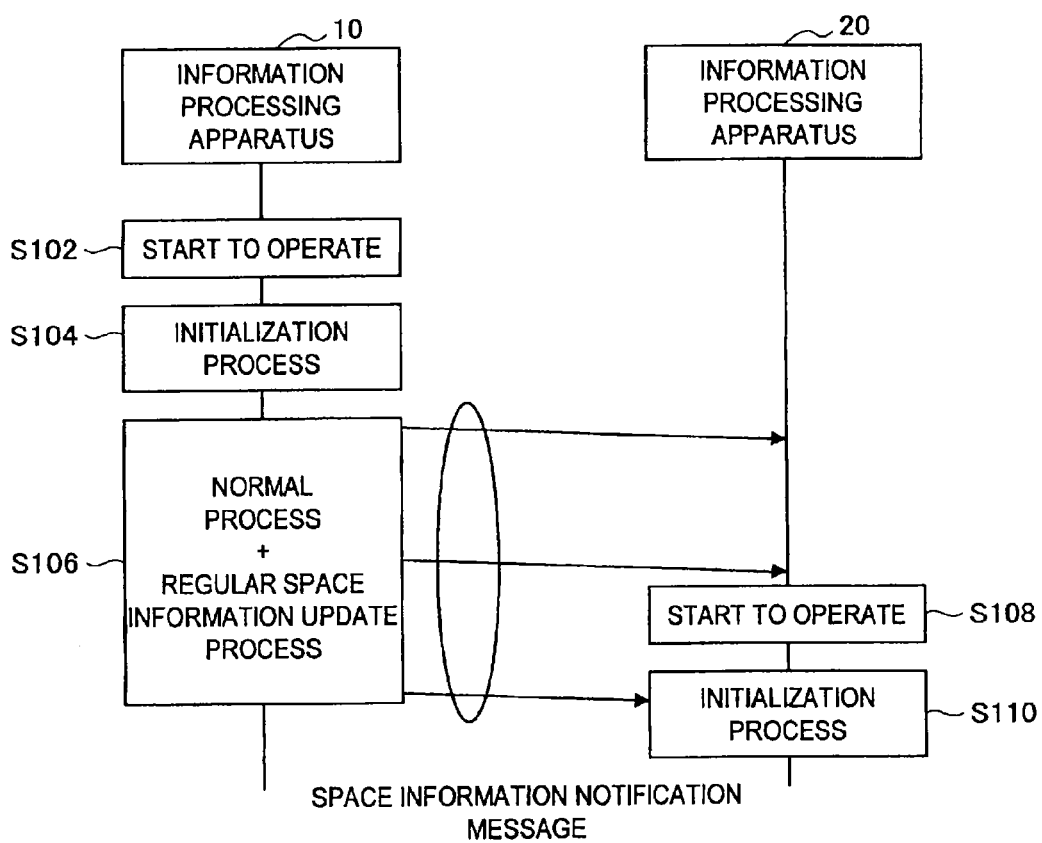
FIG. 5 is a timing chart showing a process of sharing the spatial information according to the same embodiment.

FIGS. 5 to 9 are diagrams for explaining the details of the operation of the information processing apparatus 10. FIG. 5 is a timing chart showing processes sharing the spatial information between the information processing apparatus 10 and the information processing apparatus 20. In FIG. 5, the information processing apparatus 10 starts to operate, and transmits a spatial information notification message including the spatial information to the information processing apparatus 20 starting to operate after the information processing apparatus 10.

In detail, as shown in FIG. 5, the information processing apparatus 10 starts to operate (S102) and performs an initialization process (S104). In the initialization process in step S104, a spatial coordinate system is generated or spatial information is acquired. The initialization process will be described in detail later.

Then, the information processing apparatus 10 regularly performs an update process of spatial information while performing a normal process (S106). In the normal process, a real space image is acquired or an output image is created by superimposing virtual information on the real space image. The normal process will be described in detail later. Furthermore, in the update process of the spatial information, when the information processing apparatus 10 or the information processing apparatus 20 has moved or the position of the virtual information has moved, the position information of each apparatus or the virtual information is reacquired. Also, the update process of the spatial information will be described in detail later.

The information processing apparatus 20 starts to operate (S108) and then performs an initialization process (S110). The information processing apparatus 20 receives the spatial information notification message including the spatial information from the information processing apparatus 10 in the process of performing the initialization process in step S110.

Figure 6:
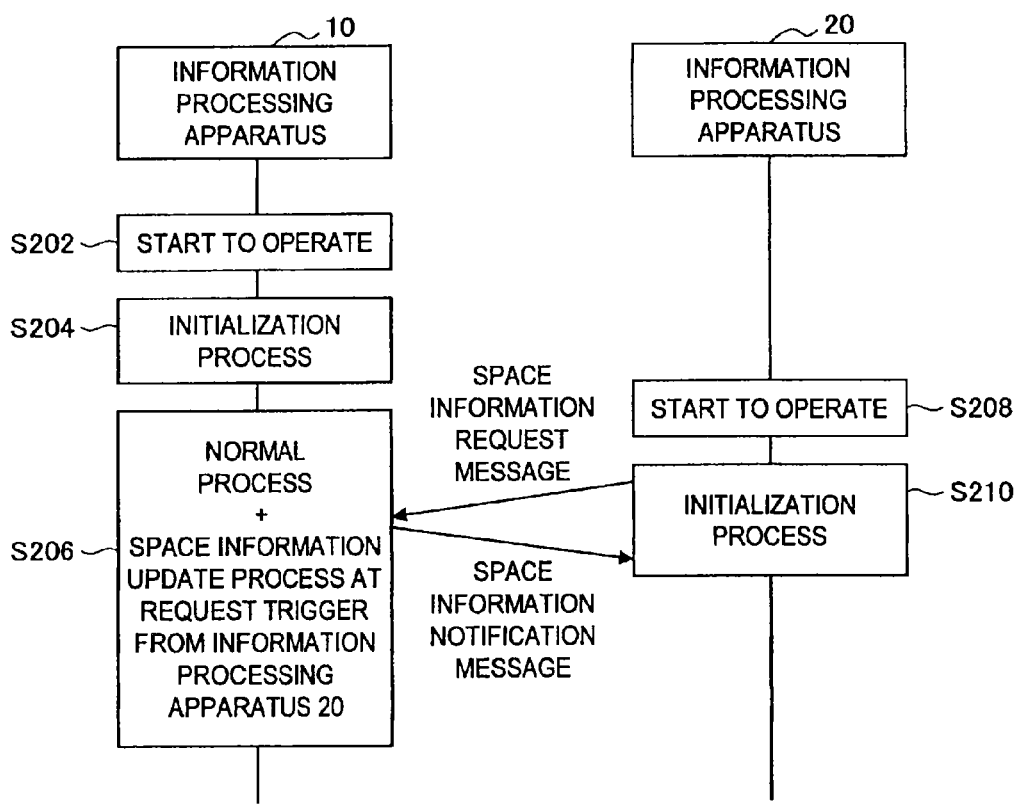
FIG. 6 is a timing chart showing a process of sharing the spatial information according to the same embodiment.

Furthermore, as shown in FIG. 6, when the spatial information notification message is requested by the information processing apparatus 20 having started to operate after the information processing apparatus 10 starts to operate, the spatial information notification message may be transmitted. In detail, the information processing apparatus 10 starts to operate (S202) and then performs an initialization process (S204). Then, while performing a normal process, the information processing apparatus 10 updates the spatial information when a request is received from the information processing apparatus 20, and transmits the spatial information notification message including the spatial information to the information processing apparatus 20 (S206).

The information processing apparatus 20 starts to operate (S208) and then performs an initialization process (S210). When performing the initialization process in step S210, the information processing apparatus 20 transmits a spatial information request message to the information processing apparatus 10. Then, the information processing apparatus 20 receives the spatial information notification message including the spatial information from the information processing apparatus 10 in the process of performing the initialization process.

Figure 7:
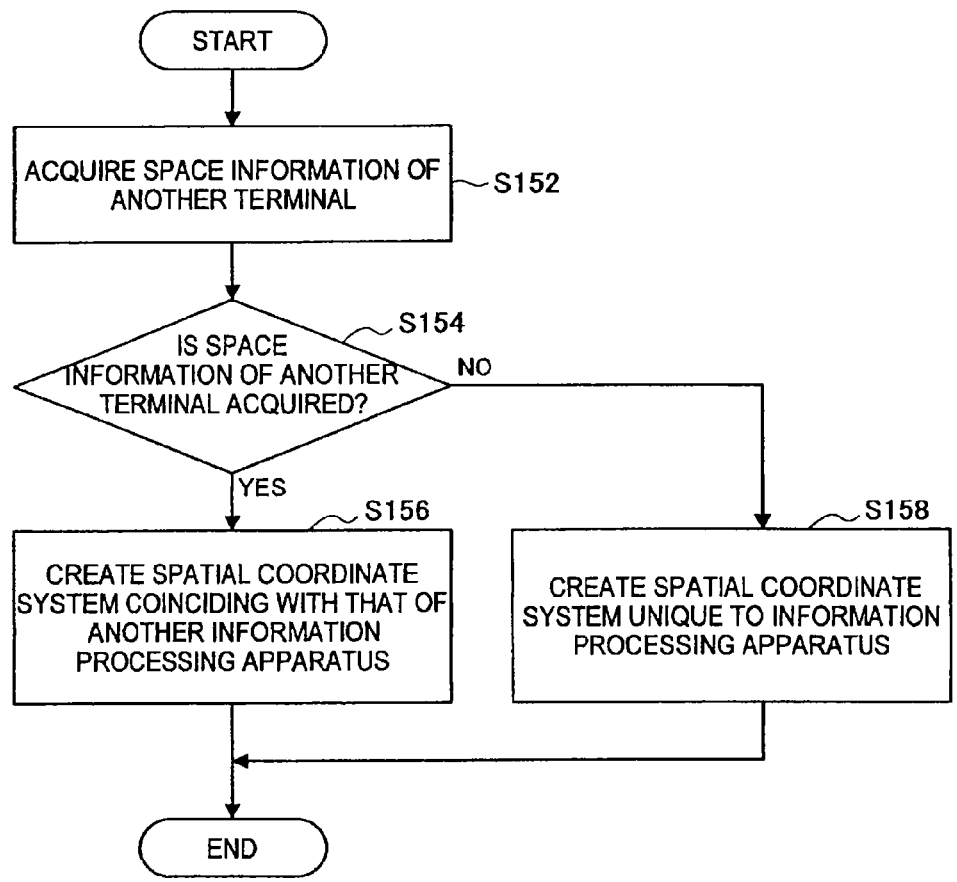
FIG. 7 is a flowchart showing details of an initialization process according to the same embodiment.
Figure 8:
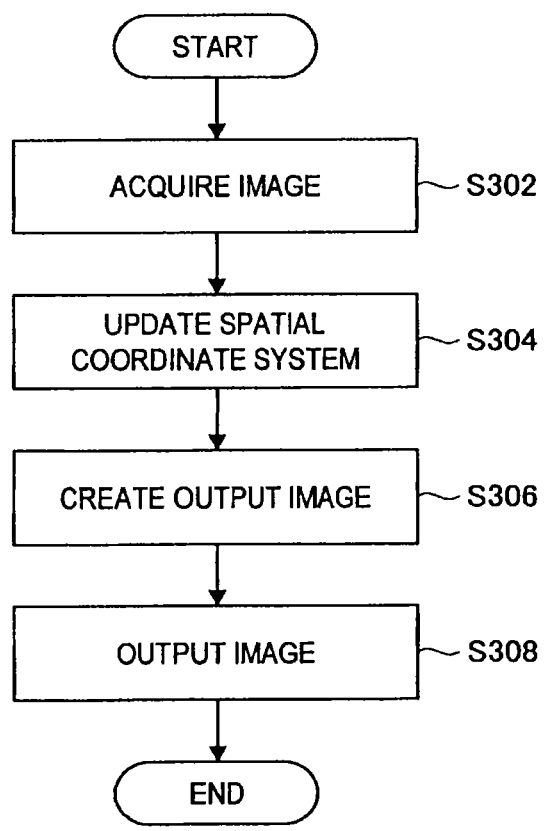
FIG. 8 is a flowchart showing details of a normal process according to the same embodiment.

Next, details of the initialization processes performed by the information processing apparatus 10 and the information processing apparatus 20 will be described. FIG. 7 is a flowchart showing the details of the initialization process. As shown in FIG. 7, the acquisition of spatial information of another information processing apparatus is first tried (S152). Then, it is determined whether or not spatial information of another terminal can be acquired in step S152 (S154).

In step S154, when it is possible to acquire the spatial information of the other terminal, a spatial coordinate system coinciding with that of the other information processing apparatus is created (S156). In step S156, the process of creating the spatial coordinate system coinciding with that of the other information processing apparatus corresponds to the initialization process performed by the information processing apparatus 20 in FIG. 5 or FIG. 6. That is, the information processing apparatus 20 acquires spatial information constituting the spatial coordinate system created by the information processing apparatus 10 having already started to operate and creates the spatial coordinate system.

In detail, the information processing apparatus 20 creates a spatial coordinate system equal to that of the information processing apparatus 10 from the spatial coordinates of the information processing apparatus 10 and the information processing apparatus 20, which are included in the spatial information, and the roll value of a vector connecting the spatial coordinate of the information processing apparatus 10 to the spatial coordinate of the information processing apparatus 20. Furthermore, the information processing apparatus 20 detects and specifies the position of the information processing apparatus 10, thereby deciding the position of the information processing apparatus 10 in a coordinate space viewed from the information processing apparatus 20.

Meanwhile, when it is not possible to acquire the spatial information of the other terminal in step S154, a spatial coordinate system unique to the information processing apparatus 10 is created (S158). In step S158, the process of creating the unique spatial coordinate system corresponds to the initialization process performed by the information processing apparatus 10 in FIG. 5 or FIG. 6.

In step S158, as described above, after creating the spatial coordinate system, the spatial coordinates of the information processing apparatus 10 and the information processing apparatus 20, and the roll value of the vector connecting the spatial coordinate of the information processing apparatus 10 to the spatial coordinate of the information processing apparatus 20 are acquired. Then, the spatial information including the spatial coordinates and the roll value of the vector is transmitted to the information processing apparatus 20.

So far, the initialization process has been described. In addition, when the information processing apparatus 20 performs the process of creating the spatial coordinate system coinciding with that of the information processing apparatus 10, the spatial coordinate system may be created through the position and posture of a camera, the position and posture of virtual information, the scale conversion and the like, not through the rotation, translation or scale conversion of a coordinate system. For example, the scale conversion of the coordinate system can be performed by converting the arrangement position and size of virtual information to be arranged. Next, the normal process in the information processing apparatus 10 will be described with reference to FIG. 8. First, the information processing apparatus 10 adjusts a frame rate and the like of an imaging apparatus such as a camera to periodically acquire a real space image (S302). Then, the information processing apparatus 10 updates a spatial coordinate system (S304). The update of the spatial coordinate system in step S304 will be described in detail later.

After updating the spatial coordinate system in step S304, the information processing apparatus 10 creates an output image by superimposing virtual information on the real space image according to the movement of the spatial coordinate (S306). Then, the information processing apparatus 10 outputs the output image created in step S306 to a display and the like (S308). In a case where another information processing apparatus notifies of the spatial information, the type and position of the virtual information superimposed on the real space image can be specified using identification information of the virtual information and the spatial coordinate which are included in the notified spatial information.

Furthermore, in a case where the other information processing apparatus does not notify of the spatial information, arbitrary virtual information stored in the storage unit 160 may be selected and superimposed on the real space image. Furthermore, predetermined virtual information may be selected according to input from a user. In addition, in a case where virtual information and position information are stored after being associated with each other, virtual information included in a predetermined range of the position information of the real space image may be acquired from the storage unit 160 and superimposed on the real space image.

Moreover, in a case where a processing load of the movement of a display position of the virtual information according to the update of the spatial coordinate system or the movement of the spatial coordinate is heavy, the update of the spatial coordinate system or the movement of the display position of the virtual information may be performed at a predetermined cycle once.

Figure 9:
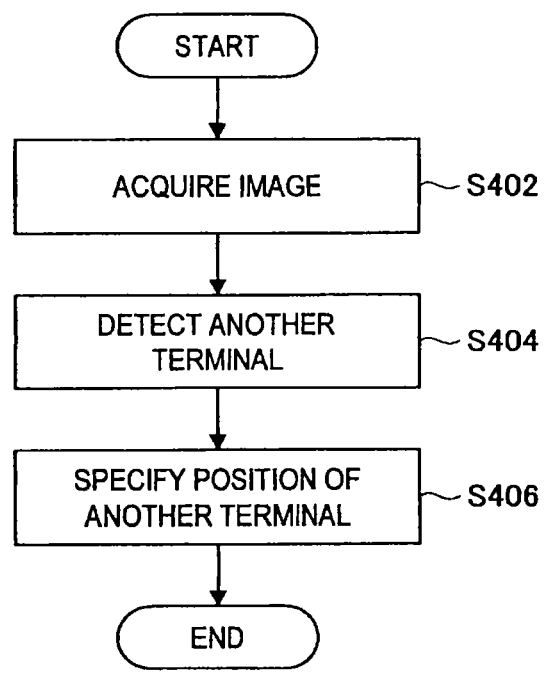
FIG. 9 is a flowchart showing details of a spatial information update process according to the same embodiment.

Next, the spatial information update process will be described in detail with reference to FIG. 9. The following spatial information update process is performed before the other information processing apparatus is notified of the spatial information, in order to allow the spatial coordinate system to be shared by the other information processing apparatus in the above-described initialization process. FIG. 9 is a flowchart showing the details of the spatial information update process of the information processing apparatus 10. As shown in FIG. 9, a real space image is acquired (S402) and then another terminal included in the real space image is detected (S404). Next, the position in the spatial coordinate system of the other terminal detected in step S404 is specified (S406).

So far, the first embodiment has been described. According to the first embodiment, when a plurality of information processing apparatuses are present, in order for a spatial coordinate system created by an information processing apparatus having already started to be shared by another information processing apparatus, spatial information constituting the spatial coordinate system is transmitted to the other information processing apparatus having started after the information processing apparatus. Then, the other information processing measure having received the spatial information transmitted from the information processing apparatus having already started generates a spatial coordinate system, which is equal to that of the information processing apparatus having already started, based on the spatial information. In this way, mutual position information of the plurality of information processing apparatuses is detected, so that a virtual space can be shared among the plurality of information processing apparatuses.

[5] Second Embodiment

[5-1] Configuration of Information Processing Apparatus

Next, the second embodiment will be described. In the second embodiment, the information processing apparatus 10 is provided with a position information acquisition system such as a global positioning system (GPS). Similarly to the first embodiment, it is possible to detect the scale of a real space image from the positional relationship between the information processing apparatus 10 and another apparatus. Since the information processing apparatus 10 according to the present embodiment has substantially the same functional configuration as the information processing apparatus 10 according to the first embodiment, detailed description thereof will be omitted.

In the present embodiment, since position information of another apparatus is acquired by the GPS, a decision process of a spatial coordinate using the GPS will be specifically described in detail. The information processing apparatus 10 notifies a GPS coordinate of the other apparatus as spatial information of which the other apparatus is notified. The other apparatus notified of its own GPS coordinate specifies virtual information to be displayed or decides the display position of the virtual information based on the notified GPS coordinate and the posture information of the other apparatus detected by a 6-axis sensor and the like.

The operation according to the present embodiment will be specifically described in detail while focusing on the differences relative to that of the first embodiment. First, the information processing apparatus 10 specifies the position (position A) of another apparatus in a real space image. The image of the other apparatus included in the real space image can be detected using a well-known image processing means for performing background difference and the like, similarly to the first embodiment.

Next, a distance (distance B) between the information processing apparatus 10 and the other apparatus is calculated. The method for calculating the distance between the information processing apparatus 10 and the other apparatus is the same as that of the first embodiment, and thus detailed description thereof will be omitted. Then, an azimuth angle (azimuth angle C) of the other apparatus is detected. The azimuth angle of the other apparatus can be detected using a 6-axis sensor and the like based on the position information of the other apparatus.

Thereafter, GPS information translated by the distance B in the direction of the azimuth angle C is calculated from a GPS coordinate value of the information processing apparatus 10 itself, and decided as a GPS coordinate of the other apparatus. The information processing apparatus 10 transmits the calculated GPS coordinate of the other apparatus to the other apparatus. In this way, a spatial coordinate axis using the GPS coordinate value of the information processing apparatus 10 as a reference can be shared between the information processing apparatus 10 and the other apparatus.

Consequently, virtual information associated with the GPS coordinate value is superimposed at a position corresponding to the GPS coordinate of the virtual information in the spatial coordinate system. Furthermore, the information processing apparatus 10 may transmit its own GPS coordinate value to the other apparatus. In such a case, the above-described calculation process of the GPS coordinate value of the other apparatus, which is performed by the information processing apparatus 10, is allowed to be performed by the other apparatus, so that it is possible to share the spatial coordinate axis therebetween.

According to the second embodiment, the value (latitude and longitude) of the GPS coordinate system is used as spatial information among a plurality of information processing apparatuses, resulting in sharing the spatial coordinate system. In this way, for example, in a case where there is virtual information which is not displayed because it is far away from one information processing apparatus while being adjacent to another information processing apparatus, it is possible to display different virtual information between the information processing apparatuses.

[6] Third Embodiment

[6-1] Configuration of Information Processing Apparatus

So far, the second embodiment has been described. Next, the third embodiment will be described. In the third embodiment, there is an information processing apparatus 30, in addition to the information processing apparatus 10 and the information processing apparatus 20 in the first embodiment. That is, a case where a spatial coordinate system is shared among three apparatuses will be described.

In the present embodiment, since the information processing apparatus 10, the information processing apparatus 20 and the information processing apparatus 30 have the same hardware configuration and functional configuration as those of the first embodiment, detailed description thereof will be omitted. In a case where there are three apparatuses, a rotation angle is not necessary as spatial information transmitted from the information processing apparatus 10 to the information processing apparatus 20 or the information processing apparatus 30.

That is, the information processing apparatus 10 creates a spatial coordinate system to acquire spatial coordinates of the information processing apparatus 20 and the information processing apparatus 30. Here, as with the first embodiment, a rotation angle such as a roll value of a vector interconnecting apparatuses is not necessary as the spatial coordinate. The information processing apparatus 10 transmits spatial information including the acquired spatial coordinates to the information processing apparatus 20.

The information processing apparatus 30 creates a spatial coordinate system equal to that created by the information processing apparatus 10 or the information processing apparatus 20. In detail, the information processing apparatus 30 creates the spatial coordinate system based on the spatial information transmitted from the information processing apparatus 10 or the information processing apparatus 20. The third embodiment has been described above. According to the third embodiment, since it is not necessary to use azimuth information as spatial information, it is possible to reduce a traffic amount among information processing apparatuses.

While the preferred embodiments of the present invention have been described above with reference to the accompanying drawings, the present invention is not limited to the above examples, of course. A person skilled in the art may find various alternations and modifications within the scope of the appended claims, and it should be understood that they will naturally come under the technical scope of the present invention.

For example, in the above embodiments, the information processing apparatus 10 performs all processes. However, the present invention is not limited thereto. For example, among the processes performed by the information processing apparatus 10, a process with a heavy load may be allowed to be performed by a server connected through a network. For example, a real space image captured by an imaging apparatus may be transmitted to the server from the information processing apparatus 10 and analyzed by the server. In such a case, the server detects position information of the information processing apparatus 10 and another apparatus from the real space image transmitted from the information processing apparatus 10, and transmits the detection result to the information processing apparatus 10. Furthermore, the server may acquire the position information and rotation angle of each information processing apparatus, and transmit the acquired position information and rotation angle to another apparatus through a network. In addition, the storage unit 160 for storing virtual information may be arranged in a server.

As described above, a process with a heavy load is performed by a server, so that power consumption of the information processing apparatus 10 can be reduced and hardware resources necessary for the information processing apparatus 10 can be compressed. Furthermore, in a case where the storage unit 160 for storing virtual information is arranged in a server, the storage capacity of the information processing apparatus 10 can be compressed, and the same virtual information can be easily used and managed among information processing apparatuses.

REFERENCE SIGNS LIST 10, 20, 30 information processing apparatus
152 image acquisition unit
154 acquisition unit
156 coordinate system generation unit
158 other terminal detection unit
160 storage unit
162 output image creation unit
164 image output unit
166 transmission unit

The invention claimed is:

1. An information processing apparatus comprising:
circuitry configured to:
   acquire a real space image including an image of another apparatus;
   generate a spatial coordinate system of the real space image;
   transmit spatial information constituting the spatial coordinate system to the another apparatus sharing the spatial coordinate system; and
   acquire the spatial coordinate of the another apparatus and a spatial coordinate of its own apparatus, wherein
the circuitry is configured to transmit the other spatial coordinate and the spatial coordinate of its own apparatus to the another apparatus as the spatial information.

2. The information processing apparatus according to claim 1, wherein the circuitry is further configured to:
   acquire a GPS coordinate of the another apparatus; and
   transmit the spatial information including the GPS coordinate of the another apparatus to the another apparatus.

3. The information processing apparatus according to claim 2, wherein
   the another apparatus notified of its own GPS coordinate specifies virtual information to be displayed or decides the display position of the virtual information based on the notified GPS coordinate and the posture information of the other apparatus detected by a 6-axis sensor.

4. The information processing apparatus according to claim 3, wherein the circuitry is further configured to:
   acquire identification information of the virtual information; and
   transmit the spatial information including the identification information of the virtual information to the another apparatus together with a spatial coordinate of a display position of the virtual information.

5. The information processing apparatus according to claim 2, wherein,
   when the virtual information is associated with a GPS coordinate of the virtual information, the circuitry is configured to acquire a spatial coordinate of a display position of the virtual information by correcting the GPS coordinate of the virtual information according to a positional relationship between the spatial coordinate of the another apparatus and the spatial coordinate of its own apparatus.

6. An information processing system, wherein one information processing apparatus comprises:
first circuitry configured to:
   acquire a real space image including an image of another apparatus;
   generate a spatial coordinate system of the real space image; and
   transmit spatial information constituting the spatial coordinate system to the another apparatus sharing the spatial coordinate system, wherein, the another apparatus is connected to the one information processing apparatus through a network and includes second circuitry configured to generate the spatial coordinate system, which is shared by the one information processing apparatus, based on the spatial information transmitted from the one information processing apparatus, and the spatial information includes a spatial coordinate of the another apparatus and a spatial coordinate of the one information processing apparatus.

7. An information processing method carried out by an information processing apparatus, comprising:

specifying a portion of another apparatus in a real space image;

calculating a distance between the information processing apparatus and the another apparatus;

detecting an azimuth angle of the another apparatus;

calculating a coordinate value of the information processing apparatus; and transmitting the calculated coordinate value of the another apparatus to the another apparatus, wherein a spatial coordinate axis using the coordinate value of the information processing apparatus as a reference is shared between the information processing apparatus and the another apparatus.

8. The information processing method according to claim 7, wherein the image of the another apparatus included in the read space image is detected by performing a background difference processing.

9. The information processing method according to claim 7, wherein the azimuth angle of the another apparatus is detected using a 6-axis sensor based on the position information of the another apparatus.

10. The information processing method according to claim 9, wherein the 6-axis sensor in a GPS position information acquisition system.

11. The information processing method according to claim 10, wherein, virtual information associated with GPS coordinate value is superimposed at a position corresponding to the GPS coordinate of the virtual information in the spatial coordinate system, and the information processing apparatus may transmit its own GPS coordinate value to the another apparatus.

12. The information processing method according to claim 10, wherein the calculation process of the GPS coordinate value of the another apparatus, which is performed by the information processing apparatus is performed by the another apparatus, so that the spatial coordinate axis is shared therebetween.

13. The information processing method according to claim 10, wherein a value of a GPS coordinate system is used as spatial information among a plurality of information processing apparatuses, resulting in sharing the spatial coordinate system.

14. An information processing apparatus, comprising:

circuitry configured to:

acquire a real space image including an image of another information processing apparatus;

receive location information of the information processing apparatus from the another information processing apparatus, wherein the location information of the information processing apparatus is acquired by the another information processing apparatus;

acquire posture information of the information processing apparatus;

generate a spatial coordinate system based on the location information and the posture information of the information processing apparatus; and generate an output image based on the spatial coordinate system and including the real space image including the image of the another information processing apparatus.

15. An information processing method carried out by an information processing apparatus, comprising:

acquiring a real space image including an image of another information processing apparatus;

receiving location information of the information processing apparatus from another information processing apparatus, wherein the location information of the information processing apparatus is acquired by the another information processing apparatus;

acquiring posture information of the information processing apparatus;

generating a spatial coordinate system based on the location information and the posture information of the information processing apparatus; and generating an output image based on the spatial coordinate system and including the real space image including the image of the another information processing apparatus.

* * * * *